(12) United States Patent
Nakanishi et al.

(10) Patent No.: US 9,641,850 B2
(45) Date of Patent: May 2, 2017

(54) VIDEO COMPRESSION DEVICE

(71) Applicant: Kabushiki Kaisha Toshiba, Tokyo (JP)

(72) Inventors: Keiri Nakanishi, Kawasaki (JP);
Masashi Jobashi, Kawasaki (JP);
Kojiro Suzuki, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 549 days.

(21) Appl. No.: 14/266,422

(22) Filed: Apr. 30, 2014

(65) Prior Publication Data

US 2014/0334541 A1    Nov. 13, 2014

(30) Foreign Application Priority Data

May 13, 2013  (JP) ................. 2013-101070
Mar. 10, 2014 (JP) ................. 2014-046923

(51) Int. Cl.
*H04N 19/11* (2014.01)
*H04N 19/182* (2014.01)
(Continued)

(52) U.S. Cl.
CPC ......... *H04N 19/182* (2014.11); *H04N 19/105* (2014.11); *H04N 19/124* (2014.11);
(Continued)

(58) Field of Classification Search
CPC .. H04N 19/103; H04N 19/176; H04N 19/593; H04N 19/14; H04N 19/152;
(Continued)

(56) References Cited

U.S. PATENT DOCUMENTS 8,315,467 B2  11/2012  Nakamura et al.
8,594,185 B2  11/2013  Ohgose et al.
(Continued)

FOREIGN PATENT DOCUMENTS

| JP | 2009-290498 | 12/2009 |
| JP | 2010-035025 | 2/2010 |
| JP | 2010-178319 | 8/2010 |
| JP | 2012-065176 | 3/2012 |
| JP | 2012-129944 | 7/2012 |

*Primary Examiner* — Nathnael Aynalem
(74) *Attorney, Agent, or Firm* — Knobbe, Martens, Olson & Bear LLP (57) ABSTRACT

With a video compression device configured to compress one pixel per cycle, a predictive pixel generation unit generates predictive pixel values of a plurality of predictive modes defined assuming local decode pixels read from predetermined positions of a line memory as upper reference pixels and an input original image pixel positioned on the left side of a pixel to be compressed as a left reference pixel for the pixel to be compressed. A predictive mode determination unit calculates a predictive error in a unit based on differential values between the pixel value to be compressed and the predictive pixel value, and selects a minimum predictive mode. A DPCM unit generates a minimum differential value between the minimum predictive pixel value and the pixel to be compressed assuming local decode pixels as upper reference pixels and a local decode pixel value one cycle before as a left reference pixel.

18 Claims, 11 Drawing Sheets

(51) Int. Cl.
*H04N 19/124* (2014.01)
*H04N 19/105* (2014.01)
*H04N 19/593* (2014.01)
*H04N 19/154* (2014.01)
*H04N 19/42* (2014.01)

(52) U.S. Cl.
CPC ............ *H04N 19/154* (2014.11); *H04N 19/42* (2014.11); *H04N 19/593* (2014.11)

(58) Field of Classification Search
CPC ........ H04N 19/61; H04N 19/00; H04N 19/13; H04N 19/159; H04N 19/184; H04N 19/182; H04N 19/157; H04N 19/107; H04N 19/11; H04N 19/146; H04N 19/105; H04N 19/33; H04N 19/50; H04N 11/046; G06T 9/004
USPC ................................ 375/240.01–240.29, 241
See application file for complete search history.

(56) References Cited

U.S. PATENT DOCUMENTS

| | | | |
|---|---|---|---|
| 9,380,303 B1* | 6/2016 | Eslami | H04N 19/13 |
| 2008/0131087 A1* | 6/2008 | Lee | H04N 19/90 386/326 |
| 2009/0161759 A1* | 6/2009 | Seo | H04N 19/176 375/240.12 |
| 2009/0297053 A1 | 12/2009 | Nakamura et al. | |
| 2010/0208794 A1 | 8/2010 | Ohgose et al. | |
| 2012/0106862 A1* | 5/2012 | Sato | H04N 19/51 382/233 |
| 2012/0140821 A1* | 6/2012 | Drugeon | H04N 19/105 375/240.12 |
| 2012/0224774 A1* | 9/2012 | Lim | G06T 9/004 382/233 |
| 2013/0201025 A1* | 8/2013 | Kamalakannan | H04N 7/185 340/632 |
| 2013/0343662 A1 | 12/2013 | Ando | |

* cited by examiner

FIG.1

FIG. 4
Original image pixel

VIDEO COMPRESSION DEVICE

CROSS-REFERENCE TO RELATED APPLICATIONS

This application is based upon and claims the benefit of priority from the prior Japan Patent Applications No. 2013-101070, filed on 13 May 2013 and No. 2014-046923, filed on 10 Mar. 2014, the entire contents of which are incorporated herein by reference.

FIELD

Embodiments described herein relate generally to a video compression device.

BACKGROUND

In recent years, for image compression in a display interface or a camera interface or image compression in a bus inside SoC (System-on-a-Chip), one pixel is input into a compressor per cycle and an expander has to expand one pixel per cycle, and thus high throughput is required. Such image compression requires a small circuit scale, but compression in units of block such as H.264 requires a large circuit scale and thus DPCM (Differential Pulse Code Modulation) based compression taking a differential relative to a predictive value in units of pixel is employed. In order to realize a high compression rate in DPCM based compression, an accuracy of predicting a predictive value needs to be increased and it is important to provide many predictive modes.

With a conventional technique, however, there is a problem that if many predictive modes are provided for DPCM in order to realize throughput at one pixel per cycle, an operation frequency of a compressor does not increase. That is, local decode pixels required for a predictive mode determination processing on a pixel to be next compressed have to be generated within one cycle, but a pulse circuit delay thereof is large and thus the operation frequency does not easily increase.

DETAILED DESCRIPTION

According to one embodiment, a video compression device which compresses one pixel per cycle includes an input original image buffer, a line memory, a predictive pixel generation unit, a predictive mode determination unit, a DPCM unit, a quantization unit, an encode unit, an inverse quantization unit, and an inverse DPCM unit.

The input original image buffer stores input original image pixels therein in a raster scan order. The line memory stores local decode pixels therein. The predictive pixel generation unit sequentially selects from among the input original image pixels and generates predictive pixel values of a plurality of predictive modes defined assuming local decode pixels read from predetermined positions of the line memory as upper reference pixels and an input original image pixel positioned on the left side of a pixel to be compressed as a left reference pixel for the pixel to be compressed. The predictive mode determination unit assumes a unit made of a predetermined number of consecutive input original image pixels as a processing unit, calculates a predictive error of the unit based on differential values between a pixel value of the pixel to be compressed in the unit and the predictive pixel value, and selects a minimum predictive mode in which the predictive error is minimum from among the plurality of predictive modes. The DPCM unit assumes local decode pixels in the line memory as upper reference pixels and a local decode pixel value one cycle before a pixel to be compressed as a left reference pixel, generating a minimum predictive pixel value corresponding to the minimum predictive mode, and generates a minimum differential value between the minimum predictive pixel value and the pixel to be compressed. The quantization unit generates quantized data in which the minimum differential value is quantized. The encode unit converts the quantized data into a transmission code. The inverse quantization unit generates inversely quantized data in which the quantized data is inversely quantized. The inverse DPCM unit generates local decode pixel values for the pixel to be compressed by use of the inversely quantized data and the minimum predictive pixel value, and sequentially storing them in the line memory.

Embodiments according to the present invention will be described below in detail with reference to the accompanying drawings.

<First Embodiment>

Figure 1:
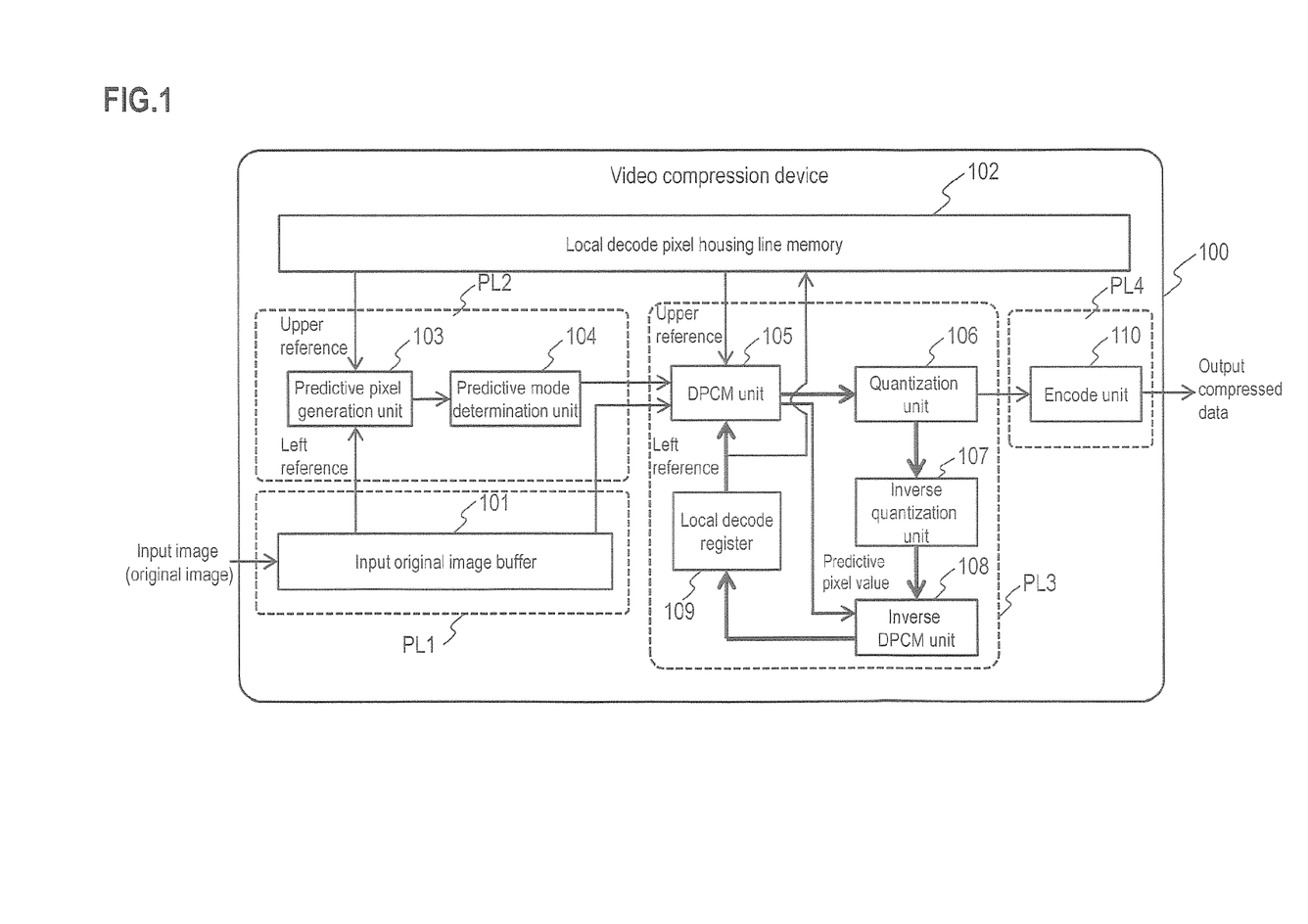
FIG. 1 is a block diagram illustrating an exemplary entire structure of a video compression device according to a first embodiment of the present invention.

FIG. 1 is a block diagram illustrating an exemplary entire structure of a video compression device 100 according to a first embodiment of the present invention. The video compression device 100 is configured of an input original image buffer 101, a local decode pixel housing line memory 102, a predictive pixel generation unit 103, a predictive mode determination unit 104, a DPCM unit 105, a quantization unit 106, an inverse quantization unit 107, an inverse DPCM unit 108, a local decode register 109 and an encode unit 110. The regions surrounded in dashed lines in FIG. 1 indicate correspondences between four pipelines PL1 to PL4 and the regions, respectively. The input original image buffer 101 is a memory for sequentially reading an input image (which will be also called "original image) to be compressed and temporarily storing it. In the present embodiment, one pixel is read per cycle in a raster scan order (throughput is at one pixel per cycle), and each element is processed by one pixel per cycle. The raster scan is a scanning system in which horizontal scanning lines in a 2D image are fast scanned from the upper left toward the lower right thereby to acquire an image. The local decode pixel housing line memory 102 is a memory for storing local decode pixels generated from the pixels of an image (original image) to be compressed (which will be called "pixels to be compressed" below). A local decode pixel generation method will be described below in detail.

The predictive pixel generation unit 103 is a circuit for generating a predictive pixel value of a pixel to be compressed based on a plurality of reference pixels at predetermined relative positions to the pixel to be compressed. In the present embodiment, the predictive pixel generation unit 103 uses local decode pixels stored in the local decode pixel housing line memory 102 as upper reference pixels of the pixel to be compressed, and uses an original image pixel read from the input original image buffer 101 as a left reference pixel of the pixel to be compressed thereby to generate a plurality of predictive pixel values corresponding to a plurality of predictive modes described later at the pixel to be compressed.

Figure 2:
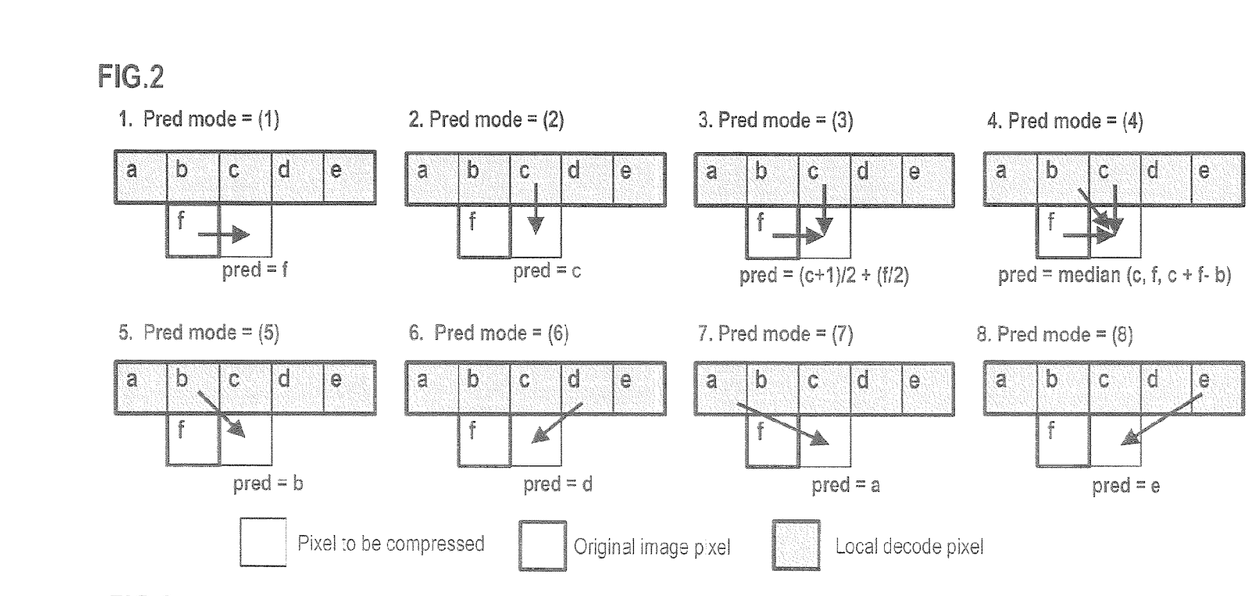
FIG. 2 is a diagram for explaining how a predictive pixel generation unit generates predictive pixel values corresponding to a plurality of predictive modes, respectively.

FIG. 2 is a diagram for explaining how the predictive pixel generation unit 103 generates predictive pixel values corresponding to a plurality of predictive modes, where a pixel and its calculation equation to be referred to when a predictive pixel value is calculated are different depending on a predictive mode. In FIG. 2, a "pred mode" value indicates a predictive mode identification number, "pred" indicates a predictive pixel value of a pixel to be compressed, and symbols a to f in the boxes indicate pixel values, respectively. Five local decode pixels positioned in the upper line of the pixel to be compressed are used as upper reference pixels, and the original image pixel left-adjacent thereto is used as a left reference pixel. For example, when the predictive mode identification number is 1, the left-adjacent original image pixel is referred to so that the predictive pixel value of the pixel to be compressed is calculated at pred=f. When the predictive mode identification number is 2, the pixel to be compressed positioned immediately above is referred to so that the predictive pixel value is calculated at pred=c. When the predictive mode identification number is 3, the predictive pixel value is calculated at pred=(c+1)/2+(f/2) based on the pixel value c of the local decode pixel in the upper line and the pixel value f of the left original image pixel. When a pixel positioned on the uppermost line or at the left end of the input image is to be compressed, no pixel is present above or leftward and thus a predetermined setting value (all the bits have a pixel value of 1, for example) is assumed to be used as a reference pixel.

Figure 3:
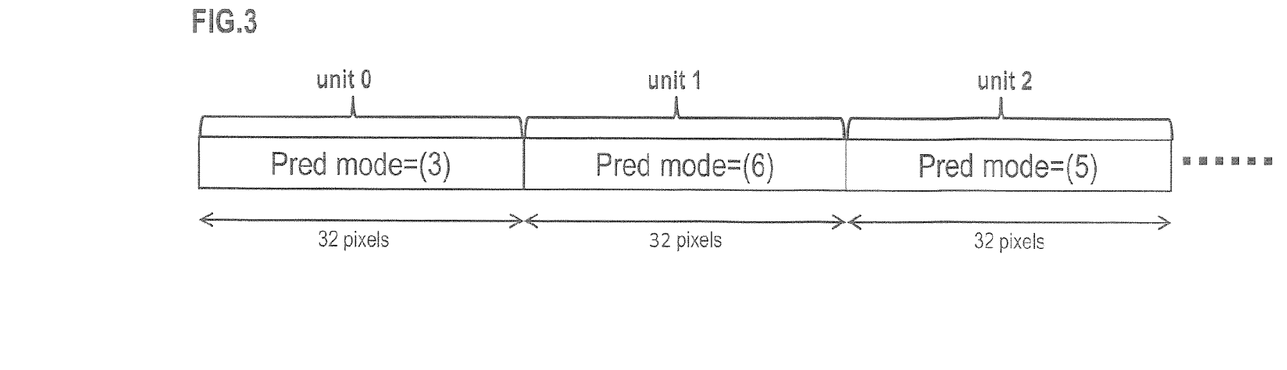
FIG. 3 is a diagram illustrating a specific example of a processing unit when a predictive mode determination unit determines a predictive mode.

The predictive mode determination unit 104 is a circuit for selecting a predictive mode in which a predictive error for a predictive pixel value generated in the predictive pixel generation unit 103 is minimum in units of consecutive horizontal pixels (which will be called "minimum predictive mode" below). FIG. 3 is a diagram illustrating a specific example of a processing unit when the predictive mode determination unit 104 determines a predictive mode. It is indicated that the predictive mode determination unit 104 processes a minimum predictive mode in units of 32 pixels (this processing unit will be called "unit" below) with the original image pixels and eight predictive pixels calculated corresponding to eight predictive modes as inputs. The number of pixels in one unit can be arbitrarily designed and changed. For example, as the number of pixels is smaller, an accuracy of the predictive mode is higher. However, a predictive mode of 3 bits is put into compressed data, and as the number of pixels in one unit is smaller, the predictive mode is more frequently put. Consequently, the number of available bits decreases and compression efficiency lowers. Inversely, when the number is too large, the processing speed is higher but the accuracy of the predictive mode is deteriorated. Therefore, one unit is suitably set at 32 pixels.

Figure 4:
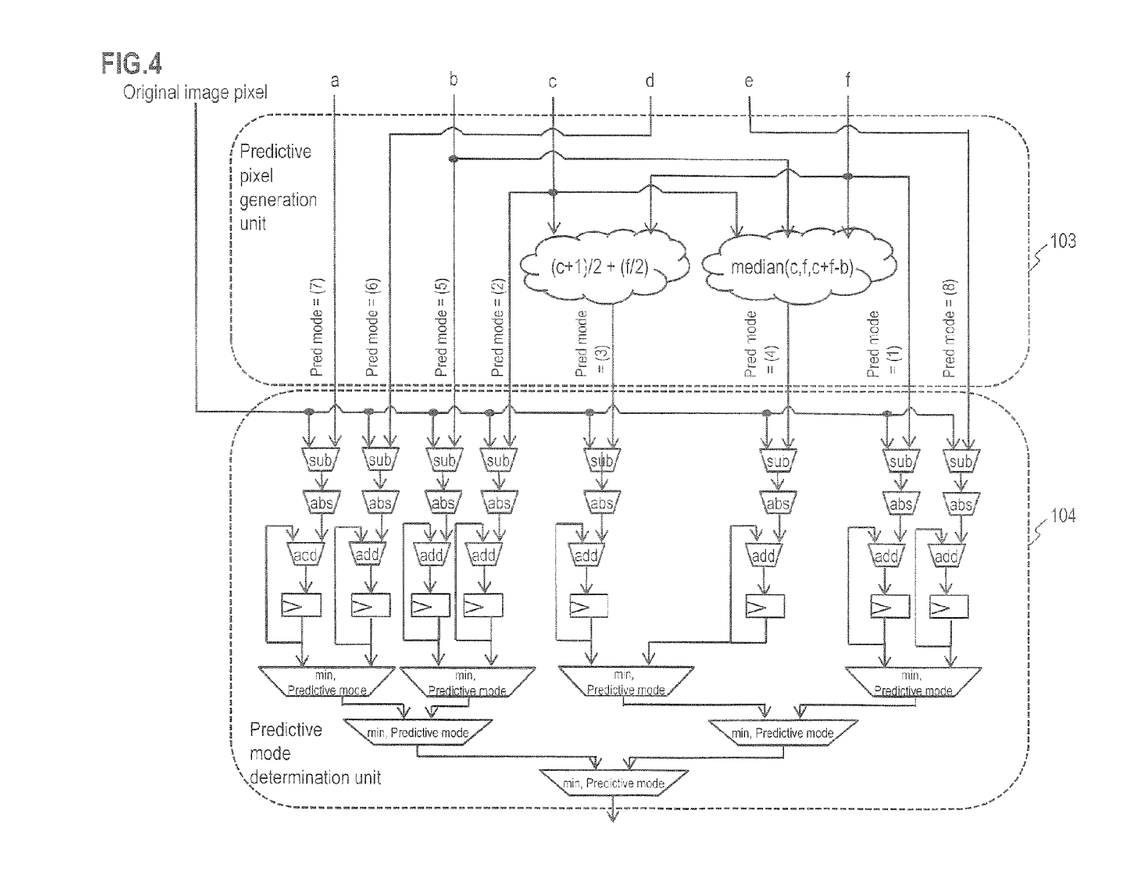
FIG. 4 is a diagram for explaining a specific structure of the predictive pixel generation unit and the predictive mode determination unit.

FIG. 4 is a diagram for explaining a specific structure of the predictive pixel generation unit 103 and the predictive mode determination unit 104 illustrated in FIG. 1. The predictive modes (Pred mode) illustrated in FIG. 4 are common with those in FIG. 2. In FIG. 4, when the predictive pixel generation unit 103 generates predictive pixel values corresponding to eight predictive modes for a pixel to be compressed in parallel, and outputs them to the predictive mode determination unit 104, the predictive mode determination unit 104 accumulatively adds the sums of absolute differences (SAD) between the predictive pixel value and the original image pixel for 32 pixels (one unit), and compares the accumulated values. A predictive mode in which SAD is minimum in each unit is assumed as a predictive mode of the 32 pixels contained in the unit.

Assuming the local decode pixels in the local decode pixel housing line memory 102 as upper reference pixels and the local decode value one cycle before the pixel to be compressed as left reference pixel, the DPCM unit 105 generates a minimum predictive pixel value corresponding to the minimum predictive mode and generates a minimum differential value between the minimum predictive pixel value and the pixel to be compressed in the predictive mode determined in the predictive mode determination unit 104, and then outputs the minimum differential value to the quantization unit 106. Unlike the predictive mode determination unit 104, the DPCM unit 105 uses the local decode pixel values for both the upper reference pixels and the left pixel for generating a minimum predictive pixel value.

The quantization unit 106 is a circuit for quantizing a differential value output from the DPCM unit 105 and outputting it as a predictive error to the inverse quantization unit 107 and the encode unit 110. The quantization method may be a method for dividing a differential value by a predetermined value and converting the resultant value into an integer value or a method using nonlinear mapping. To the contrary, the inverse quantization unit 107 is a circuit for inversely quantizing the predictive error quantized by the quantization unit 106 and outputting the resultant value to the inverse DPCM unit 108. The inverse quantization method may be a method for multiplying a quantized value by a coefficient value used for quantizing a predictive error value or a method using nonlinear mapping.

Generally, since an original image is different from a decoded image in lossy compression for quantization, if a predictive pixel value is generated from an original image in an encoder, the predictive pixel value cannot be reproduced in a decoder. Similarly, a value obtained by quantizing/inversely quantizing a differential value between a predictive pixel value generated by the original image and an original image pixel value cannot be also reproduced in the decoder. Consequently, an error is generated between the decoder and the encoder, and the error is accumulated in the decoder, and thus the image quality of the image reproduced in the decoder cannot be controlled in the encoder.

In order to avoid error accumulation on decoding, the encoder has to generate a predictive pixel by use of a decode pixel generated in the decoder (which is a decode pixel value generated inside the encoder and thus is called "local decode pixel") when generating a differential value between a predictive pixel to be actually encoded and an original image pixel.

The inverse DPCM unit 108 generates a local decode pixel value of a pixel to be compressed based on the predictive pixel value (minimum predictive pixel value) corresponding to the inversely quantized data and its pixels output by the inverse quantization unit 107 for the pixel to be compressed, and outputs it to the local decode register 109. The local decode register 109 stores the local decode pixel value output by the inverse DPCM unit 108 in the local decode pixel housing line memory 102. That is, the inverse DPCM unit 108 performs an inverse processing to the DPCM unit 105. As described above, when a pixel which is input in the raster scan order, is compressed in units of pixel in the raster scan order and is positioned on the left side of the pixel to be compressed during predictive pixel generation is used as a left reference pixel, the local decode pixel values generated for the pixel to be compressed P1 are used as left reference pixels in the DPCM unit 105 for generating a minimum predictive pixel value of the pixel to be compressed in the next cycle (P2 positioned on the left side of P1 by one pixel).

The encode unit 110 is a circuit for encoding a predictive error output by the quantization unit 106 by a variable length or fixed length and outputting it as compressed data. In the present embodiment, a predictive pixel value is generated by the original image pixel values thereby to determine a predictive mode and a predictive pixel value is generated by use of only the local decode pixel values during actual encoding, but a predictive pixel can be reproduced also in the decoder during encoding because the encode unit 110 transmits the compressed data including the predictive mode and the quantization parameters to the decoder. The compressed data will be described below in detail.

In this way, the data quantized in the quantization unit 106 is subjected to the inverse quantization processing and the inverse DPCM processing, and is divided into the first path for generating local decode pixel values and the second path leading to the encode unit 110. Since one pixel has to be processed per cycle (throughput is at one pixel per cycle) in the first path, the predictive pixel value generation processing using the local decode pixel values, the processing of generating a differential value relative to an original image pixel, the quantization processing, the inverse quantization processing and the inverse DPCM processing, which are a loop for local decode pixel generation, have to be completed within one cycle. Therefore, the loop for local decode pixel generation easily causes a critical path, and an operation frequency is determined by a circuit delay in the local decode pixel generation loop in many cases.

Figure 5A:
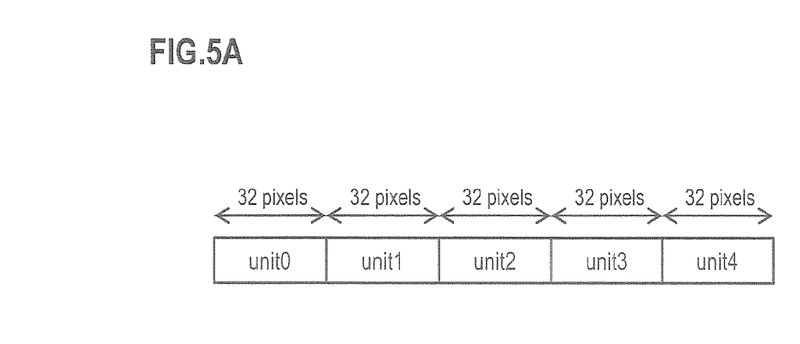
FIG. 5A is a diagram for explaining a processing unit in the video compression device.
Figure 5B:
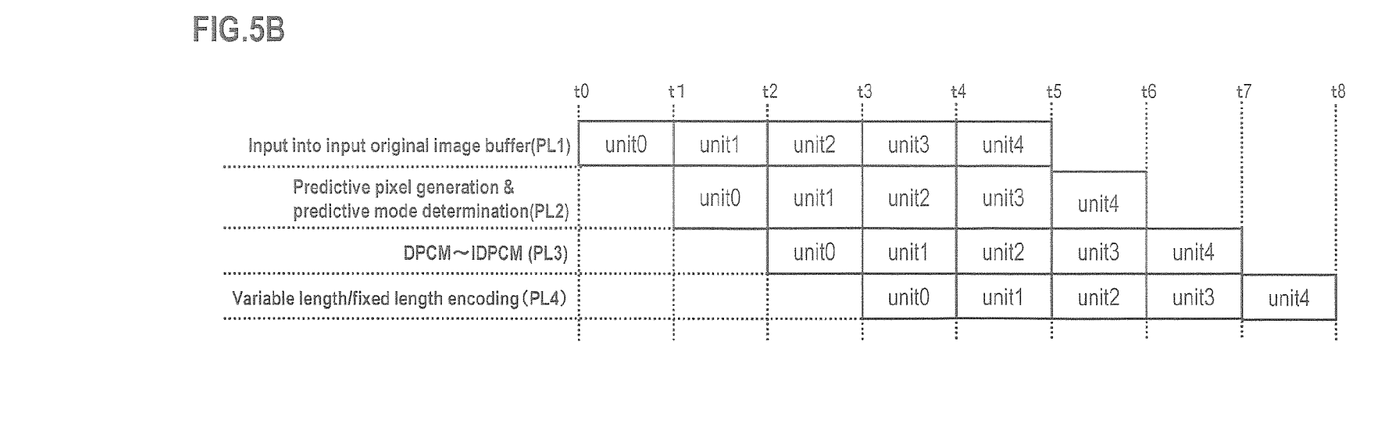
FIG. 5B is an operation timing chart of pipeline processing in the video compression device.

FIG. 5A is a diagram for explaining a processing unit in the video compression device 100, where five units (units 0 to 4) consecutive in units of 32 pixels are illustrated by way of example. FIG. 5B is an operation timing chart of the pipeline processing on the units in FIG. 5A. There are illustrated herein the first pipeline PL1 for inputting into the input original image buffer 101, the second pipeline PL2 for predictive pixel generation and predictive mode determination, the third pipeline PL3 for performing a local decode generation processing configured of DPCM, quantization, inverse quantization and inverse DPCM, and the fourth pipeline PL4 for encoding quantized data by a variable length or fixed length. The processing in the four PL1 to PL4 are performed on a unit basis. For example, an input processing into the input original image buffer 101 is performed for unit 0 in the first pipeline PL1 at time t0 to t1 while a processing is not performed in the second pipeline PL2, the third pipeline PL3 and the fourth pipeline PL4.

The local decode pixel generation processing is performed for unit 0 in the third pipeline PL3 at time t2 to t3, and at the same time, the predictive pixel generation processing and the predictive mode determination processing are performed for unit 1 in the second pipeline PL2, and the input processing into the input original image buffer 101 is performed for unit 2 in the first pipeline PL1. At this time, no processing is performed in the fourth pipeline PL4.

The variable length/fixed length encode processing is performed for unit 0 in the fourth pipeline PL4 at time t3 to t4, while the local decode pixel generation processing is performed for unit 1 in the third pipeline PL3, the predictive pixel generation processing and the predictive mode determination pixel are performed for unit 2 in the second pipeline PL2 and the input processing into the input original image buffer 101 is performed for unit 3 in the first pipeline PL1. Such pipeline processing enables a higher throughput processing to be realized.

A series of operations in the video compression device with the above structure will be described below.

At first, an input image (original image) is stored in the input original image buffer 101 in the raster scan order (FIG. 5B: PL1).

Then, the predictive pixel generation unit 103 generates predictive pixel values of a plurality of predictive modes in which the local decode pixels read from predetermined positions in the local decode pixel housing line memory 102 are assumed as upper reference pixels and an input original image pixel on the left side of a pixel to be compressed is assumed as a left reference image for the pixel to be compressed selected from the original image pixels (FIG. 5B: PL2)

Then, the predictive mode determination unit 104 selects a minimum predictive mode in which a predictive error between the pixel value of the pixel to be compressed and the predictive pixel value generated on a unit basis by the predictive pixel generation unit 103 is minimum, from among a plurality of predictive modes, assuming a unit made of a predetermined number of consecutive original image pixels as a processing unit. For example, when one unit is made of 32 pixels, the predictive pixel generation unit 103 calculates the predictive pixel values of eight predictive modes per pixel. Then, the predictive mode determination unit 104 accumulatively adds the sums of absolute differences (SAD) between the predictive pixel value and the original image pixel for 32 pixels, and selects a minimum predictive mode depending on a comparative result of the integrated values per predictive mode (FIG. 5B: PL2). The pixels in the same unit are associated with the same predictive mode.

Then, the DPCM unit 105 generates a predictive pixel value by use of the local decode pixel values as both the upper reference pixels and the let reference pixel depending on a predictive mode determined by the predictive mode determination unit 104, generates the differential value between the predictive pixel value and the original image pixel, and outputs it to the quantization unit 106 (FIG. 5B: PL3).

Then, the quantization unit 106 quantizes the differential value output from the DPCM unit 105 based on a predetermined quantization parameter, and outputs it as a predictive error to the inverse quantization unit 107 and the encode unit 110, respectively (FIG. 5B: PL3). The path is divided into two from the quantization unit 106.

In the first path, the inverse quantization unit 107 inversely quantizes the predictive error value quantized by the quantization unit 106, and outputs its processing result to the inverse DPCM unit 108 (FIG. 5B: PL3).

Then, the inverse DPCM unit 108 generates the local decode pixel values based on the predictive pixel values corresponding to the inversely quantized data and its pixels output from the inverse quantization unit 107 for the pixel to be compressed, and stores them in the local decode register 109. The local decode register 109 stores the local decode pixel values in the local decode pixel housing line memory 102 (FIG. 5B: PL3).

On the other hand, in the second path, the encode unit 110 outputs the compressed data (transmission stream) including the predictive mode and the predictive error value to the output destinations such as display interface and camera interface (FIG. 5B: PL4).

Figure 6A:
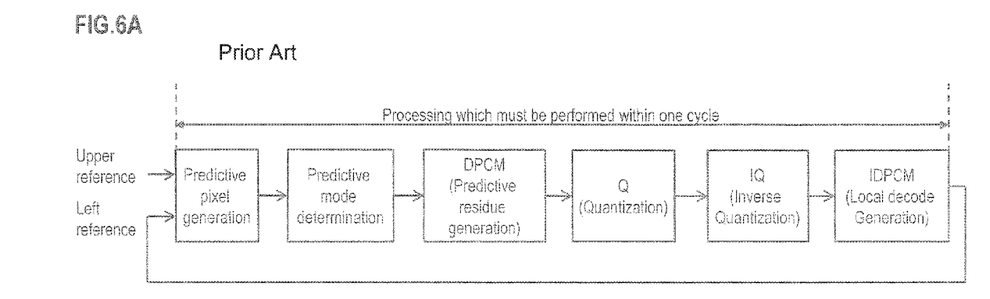
FIG. 6A is a diagram for explaining a processing flow in a conventional video compression device.
Figure 6B:
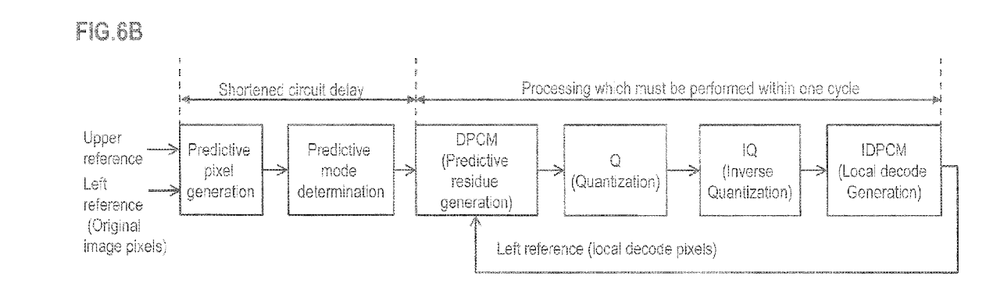
FIG. 6B is a diagram for explaining a processing flow in the video compression device according to the first embodiment.

FIGS. 6A and 6B are the diagrams for explaining the processing flows of a conventional video compression device and the video compression device 100 illustrated in FIG. 1 by comparison. FIG. 6A indicates a processing flow of the conventional video compression device, where predictive pixel generation to local decode pixel generation are included in one loop. To the contrary, FIG. 6B illustrates a processing flow of the video compression device 100 according to the present embodiment. Unlike in FIG. 6A, the loop of the local decode pixel generation and the path from the predictive pixel generation to the predictive mode determination are divided into different stages of the pipelines, and thus the path in the loop of the local decode pixel generation is shortened. Generally, a processing time T1 in the path from the predictive pixel generation to the predictive mode determination requires about half a processing time T2 in the local decode pixel generation, and thus the processing time T1 is about one third of the total processing time of the loop in FIG. 6A. As in the FIG. 6B, however, in the present embodiment, the predictive pixel generation to the predictive mode determination is branched from the loop and is independently performed in another pipeline (the first pipeline PL1). The path in the loop is shortened, and thus the processing time in the loop is two third shorter than ever before. The predictive mode determination processing performed in the first pipeline PL1 uses an input original image for a left reference pixel, and thus the local decode pixels do not need to be generated. That is, there is no dependence on the local decode pixel generation processing performed in the second pipeline PL2, and thus the predictive mode of the pixel to be compressed can be earlier determined.

In this way, with the video compression device 100 according to the present embodiment, in the image compression which generates predictive pixels and predictive image in a 2D direction and uses differential pixel values and differential image, the local decode pixels as upper reference pixels and an original image pixel value as a left reference pixel are used for determining a predictive mode. The processing which have to be performed within one cycle, or a reduction in delay of the processing circuit and a predictive mode selection can be made at a high accuracy at the same time so that an operation frequency and throughout can be enhanced and compression with higher quality is enabled.

<Second Embodiment>

Figure 7:
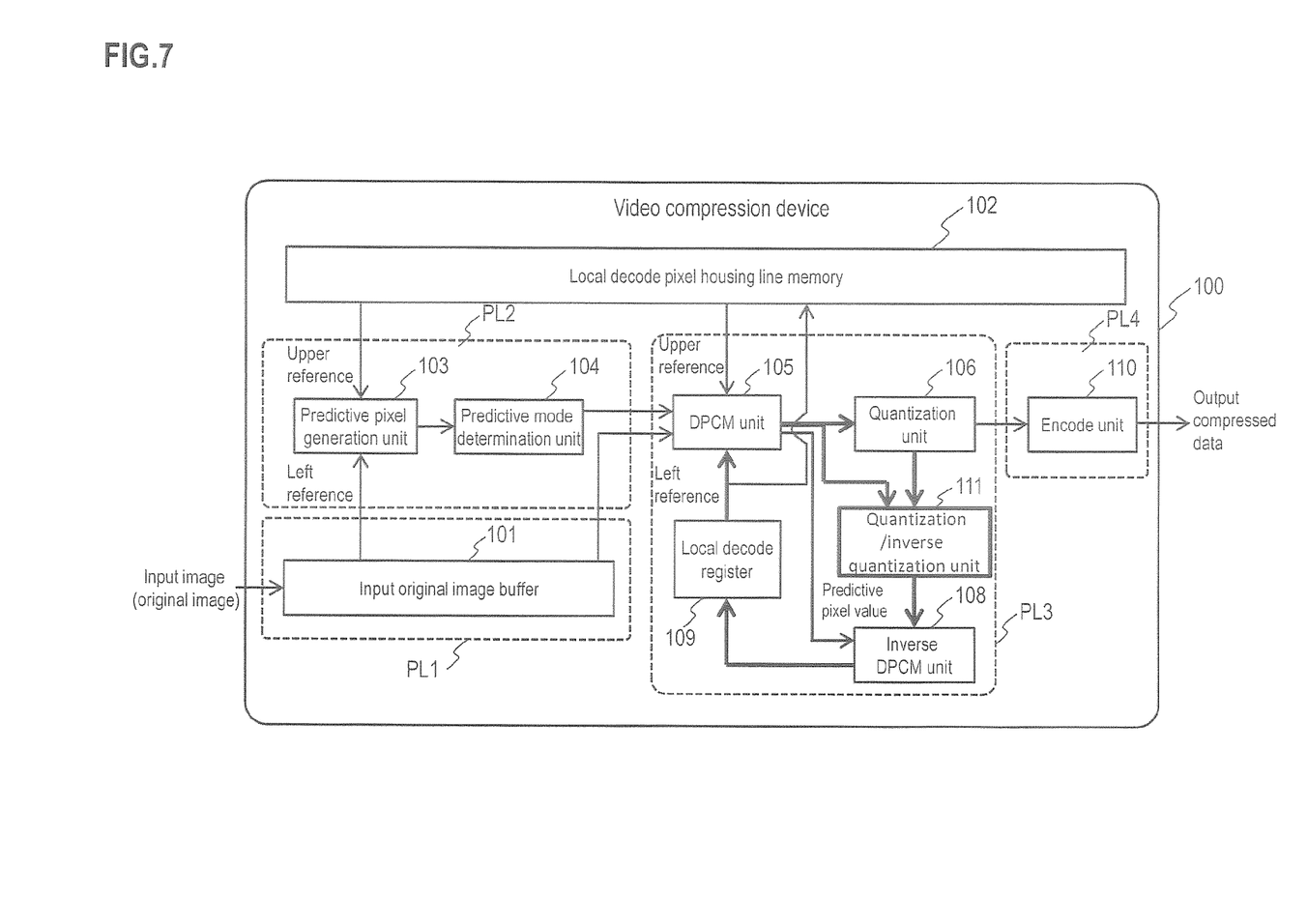
FIG. 7 is a block diagram illustrating an exemplary entire structure of the video compression device according to a second embodiment of the present invention.

FIG. 7 is a block diagram illustrating an exemplary entire structure of the video compression device 100 according to a second embodiment of the present invention. As illustrated, according to the present embodiment, a quantization/inverse quantization unit 111 for performing a quantization processing and an inverse quantization processing at the same time is provided in addition to the quantization unit 106 for variable length/fixed length encoding in the first path according to the first embodiment, and is directly input with a differential value from the DPCM unit 105. The quantization/inverse quantization unit 111 does not link the quantization unit 106 and the inverse quantization unit 107, and is a circuit for acquiring quantization/inverse quantization results at one time with reference to a table. The table is assumed to define therein correspondences between the output results of the DPCM unit 105 such as differential value and quantization parameter value, and quantization/inverse quantization results.

In the first embodiment, the quantization unit 106 and the inverse quantization unit 107 are directly linked and thus a calculation processing is required in each unit, but the video compression device 100 according to the present embodiment does not need to perform calculation processing for quantization and inverse quantization. The quantization/inverse quantization unit 111 acquires the quantization/inverse quantization results at one time with reference to the table, and thus a circuit delay in the loop of the local decode generation is smaller than in the first embodiment. Consequently, a circuit de lay in the path of the local decode generation is smaller and a critical path is improved so that an operation frequency is enhanced and throughput is also improved.

<Third Embodiment>

Figure 8:
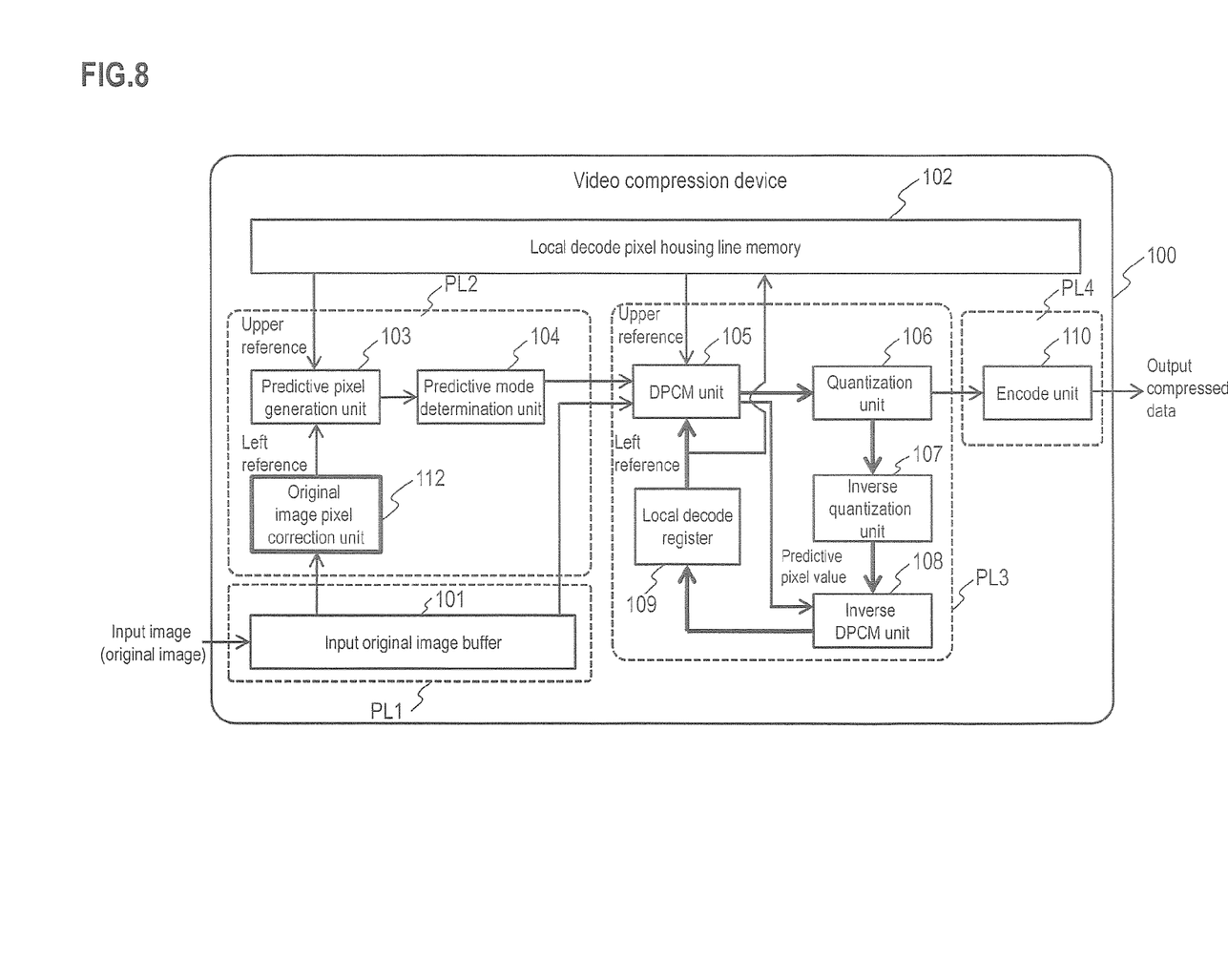
FIG. 8 is a block diagram illustrating an exemplary entire structure of the video compression device according to a third embodiment of the present invention.

FIG. 8 is a block diagram illustrating an exemplary entire structure of the video compression device 100 according to a third embodiment of the present invention. In the first embodiment described above, the upper reference pixels employ the local decode pixels and the left reference pixel uses an input original image pixel as it is during predictive pixel generation. The predictive accuracy is enhanced and the compression efficiency/quality is improved by use of the local decode pixels as the reference pixels, but by use of a local decode pixel as a left reference pixel, the circuit delay in the local decode pixel generation is large as described above, and the operation frequency does not increase.

Thus, the video compression device 100 according to the present embodiment is provided with an original image pixel correction unit 112, and uses pseudo local decode pixels generated from only original image pixels as left reference pixels in the predictive pixel generation unit 103. The following methods are effective for the pseudo local decode pixel generation method in the original image pixel correction unit 112, for example.

1. To output values obtained by quantizing/inversely quantizing original image pixels.

2. To output lower bits of the original image pixels at a specific value, or to assume lower bits at 0 according to a quantization parameter.

3. When adjacent differential values of a plurality of original image pixels to be referred to leftward in the future are consecutively equal to or less than a certain threshold, to consider left prediction as effective, and to apply a horizontal low-pass filter for better left prediction and to output an averaged value in the horizontal direction.

Figure 9:
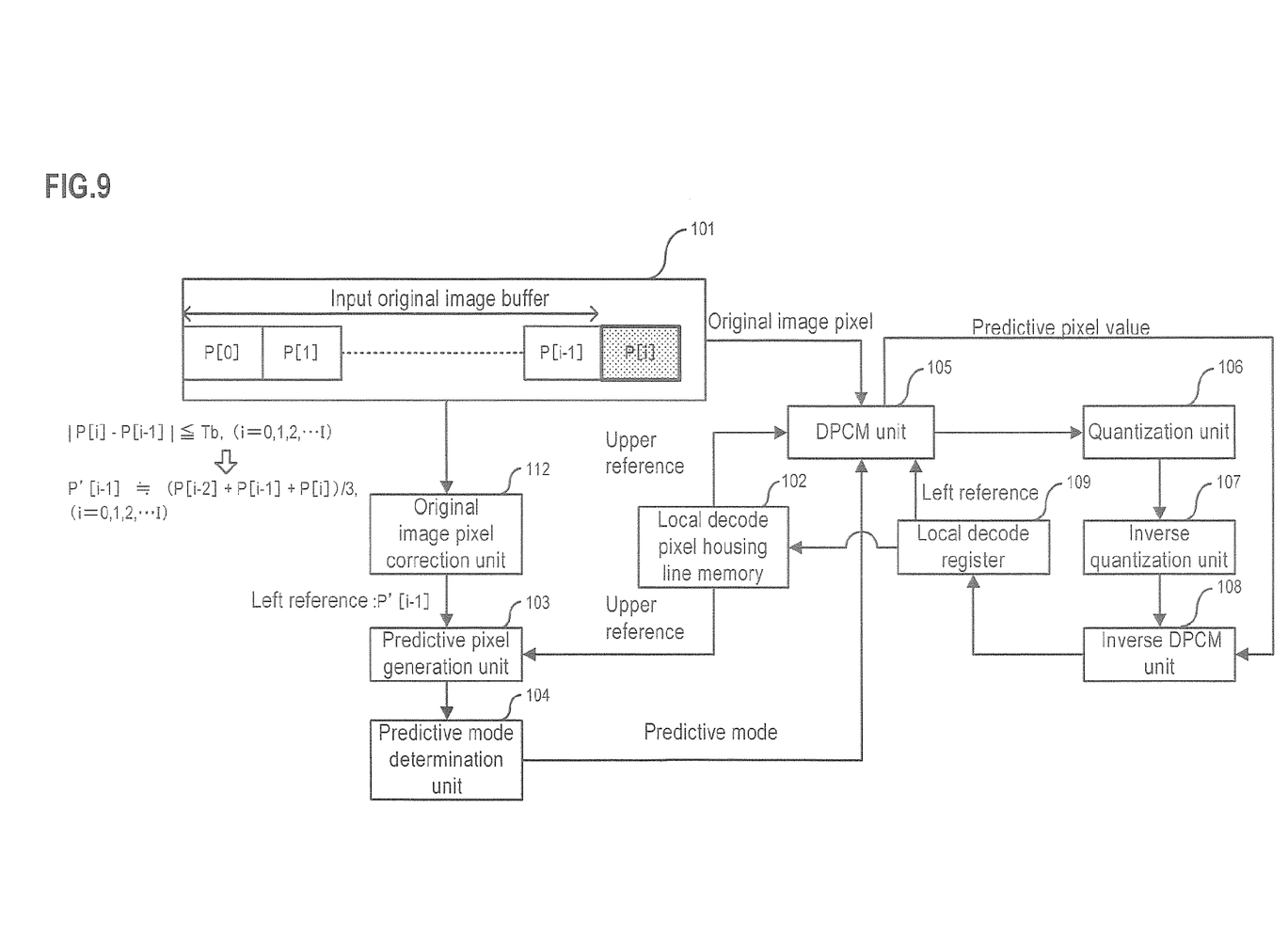
FIG. 9 is a diagram illustrating an example in which pseudo local decode pixels are generated in the video compression device.

FIG. 9 is a diagram illustrating exemplary generation of pseudo local decode pixels in the video compression device 100 illustrated in FIG. 8, and corresponds to the case 3. There is illustrated herein an example in which before an original image pixel P[i] is selected as a pixel to be compressed in a group of original image pixels stored in the input original image buffer 101, a pseudo local decode pixel P' [i−1] used as a left reference pixel in the predictive mode determination processing on the pixel is generated. i pixels P[0] to P[i−1] positioned on the left side of the original image pixel P[i] in the group of original image pixels are read prior to the predictive mode determination processing, and the absolute values of the differential values between two adjacent original image pixels P[i] and P [i−1] are sequentially calculated from the left side. Then, when each calculated absolute value is a threshold Tb or less, a pseudo local decode pixel P' [i−1] used as a left reference pixel on the predictive mode determination is calculated as an average of the three horizontally consecutive original image pixels P[i−2], P[i−1] and P[i].

The original image pixel correction unit 112 can serve as a pipeline because it does not have a dependence on the local decode pixel generation loop, and thus does not lower the operation frequency.

As described above, with the video compression device 100 according to the present embodiment, not an original image pixel or local decode pixel but a pseudo local decode pixel generated from only the original image by the original image pixel correction unit 112 is used as a left reference pixel in the predictive pixel generation unit 103, and thus the advantages of the first embodiment are also obtained and a higher compression efficiency and higher image quality are achieved than in the first embodiment.

<Fourth Embodiment>

Figure 10:
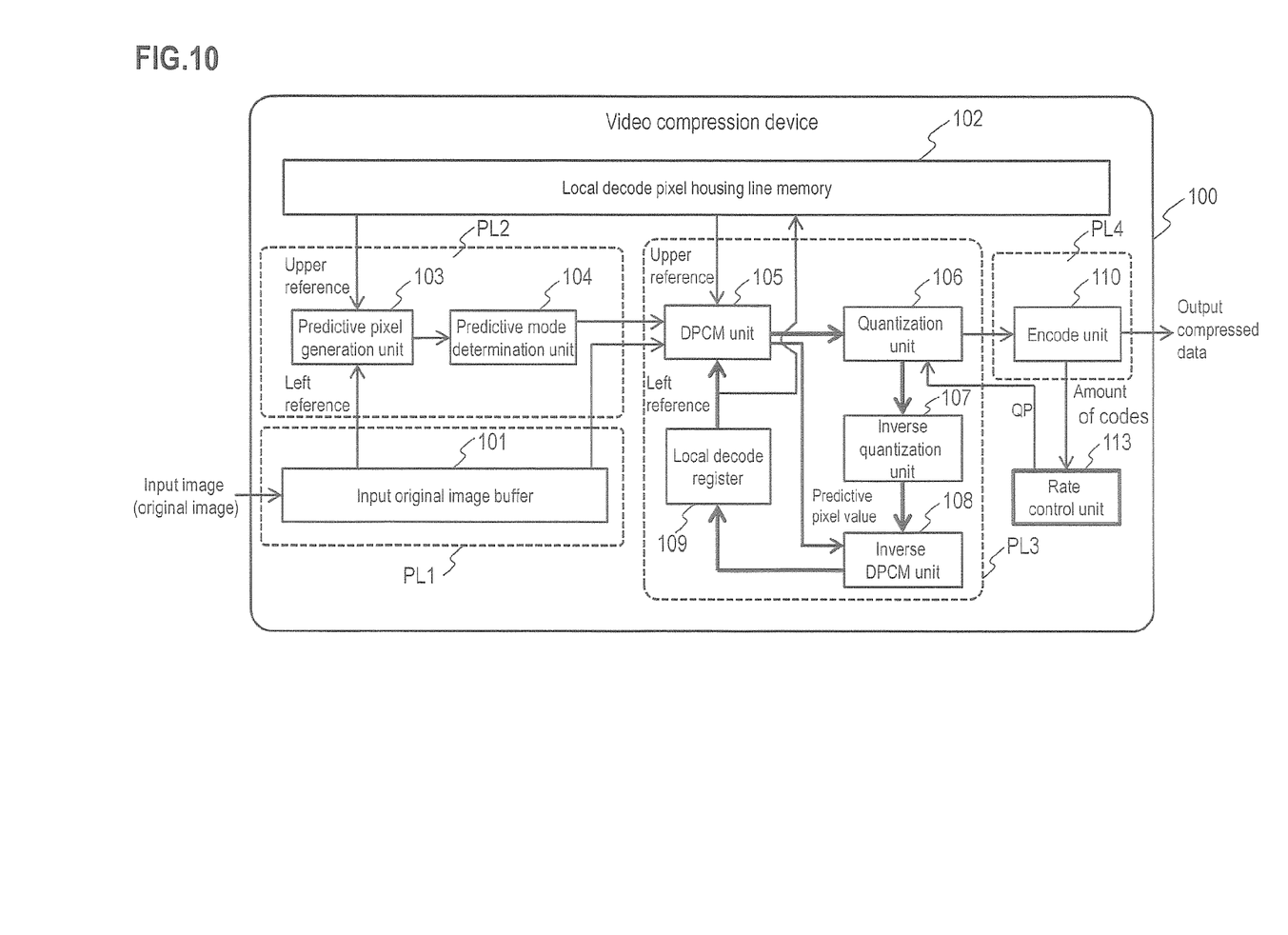
FIG. 10 is a block diagram illustrating an exemplary entire structure of the video compression device according to a fourth embodiment of the present invention.

FIG. 10 is a block diagram illustrating an exemplary entire structure of the video compression device according to a fourth embodiment of the present invention. The present embodiment has a device structure in which the first embodiment is further provided with a rate control unit 113.

The rate control unit 113 is a circuit for controlling compressed data at a constant transmission rate in the encode unit 110, and is directed for switching a quantization parameter per signal type included in the compressed data based on the encode amount input from the encode unit 110. For example, when the amount of codes in the encode unit 110 is too much and the transmission rate of the compressed data exceeds a predetermined value, the value of a quantization parameter is increased, thereby reducing the amount of codes.

Figure 11:
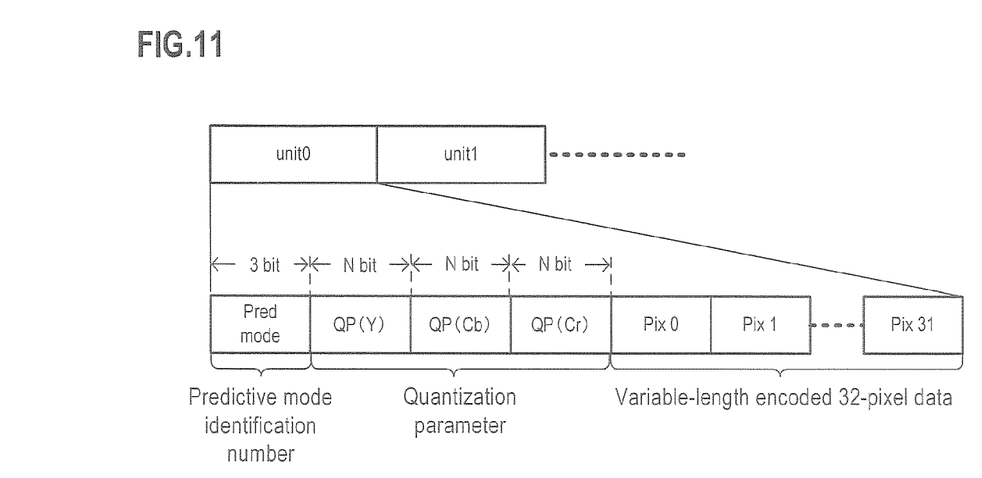
FIG. 11 is a diagram illustrating an exemplary data structure of compressed data output by an encode unit.

FIG. 11 is a diagram illustrating an exemplary data structure of compressed data output by the encode unit 110. There is illustrated herein an example in which when unit 0 made of 32 pixels configuring part of an original image is compressed, the value of a predictive mode determined in the predictive mode determination unit 104 is stored as a predictive mode identification number in the head 3 bits, and then the quantization parameters including luminance signal (Y), color difference signal (Cb) and color difference signal (Cr) are stored in each N bit, and finally data (predictive pixel values) obtained by encoding the pixel values of the 32 pixels by a variable length, respectively, are stored. There is configured such that the quantization parameters can be arbitrarily set by the rate control unit 113 and thus the processing contents in the quantization unit 106 can be changed per signal type. For example, the original image pixel values are divided by 8 for luminance signal (Y) and the original image pixel values are divided by 4 for color difference signal (Cb) and color difference signal (Cr), thereby controlling quantization.

In this way, with the video compression device according to the present embodiment, the encode unit 110 transmits the predictive mode and the quantization parameters included in the compressed data to the decoder, and thus the predictive pixels on encoding can be reproduced also in the decoder based on the predictive mode and the quantization parameters. The quantization level can be flexibly changed per signal type included in the compressed data.

Some variants of the above embodiments will be described below.

<Fifth Embodiment>

Figure 12:
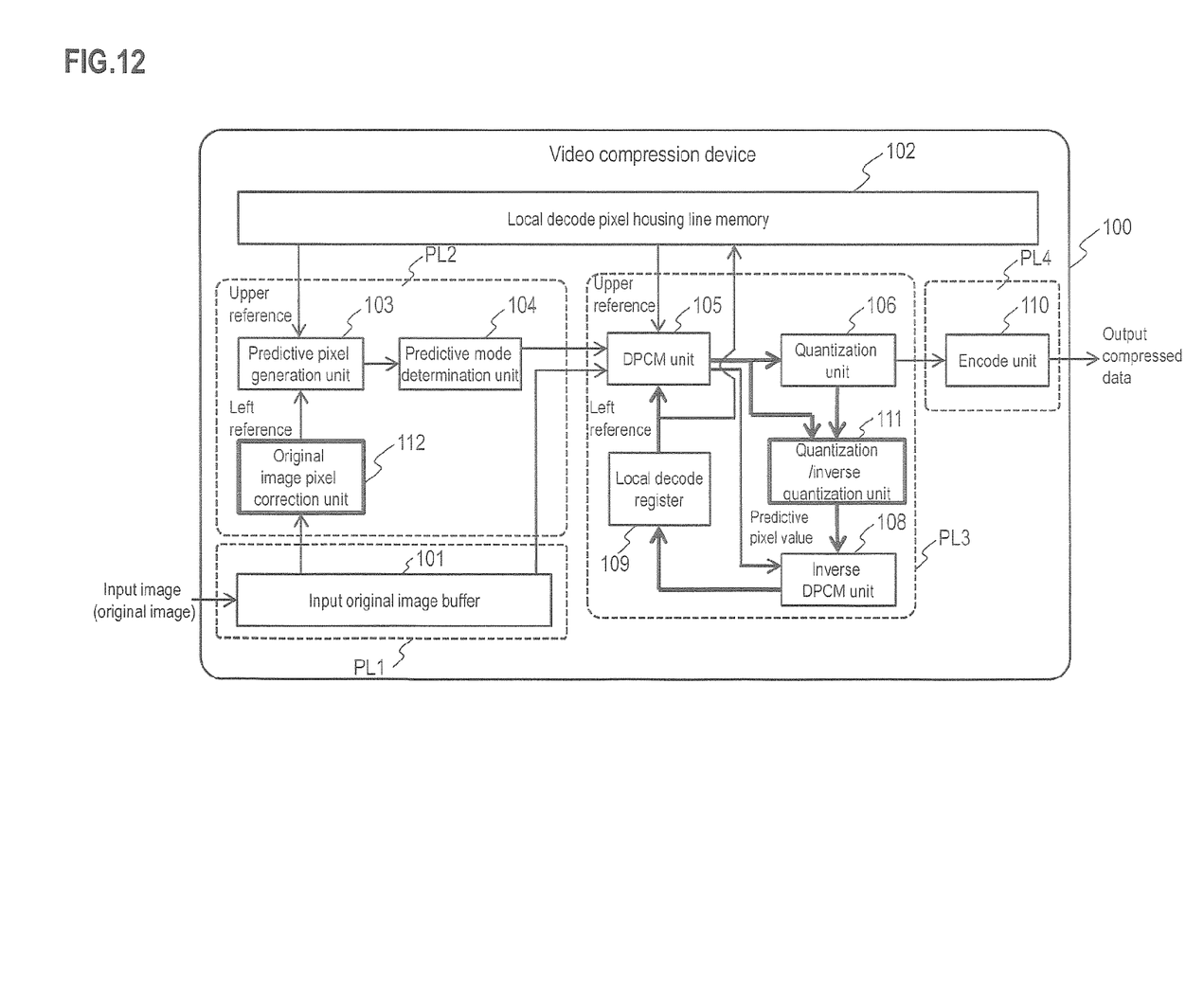
FIG. 12 is a block diagram illustrating an exemplary entire structure of the video compression device according to a fifth embodiment of the present invention.

FIG. 12 is a block diagram illustrating an exemplary entire structure of the video compression device according to a fifth embodiment of the present invention. The present embodiment is configured such that the second embodiment and the third embodiment are combined and the quantization/inverse quantization unit 111 and the original image pixel correction unit 112 are added to the device according to the first embodiment. Therefore, the advantages of the second embodiment and the third embodiment are obtained together.

<Variants>

Each embodiment described above may be varied as follows.

For example, when software for the processing according to the first embodiment is mounted (first variant), the predictive pixel generation and the predictive mode selection can be performed in parallel in different threads from the local decode pixel generation including 2D DPCM so that throughput is enhanced like when hardware is mounted.

When software for the processing according to the second embodiment is mounted (second variant), as in the first variant, the predictive pixel generation and the predictive mode selection can be performed in parallel in different threads from the local decode pixel generation including 2D DPCM, and the quantization and variable length/fixed length encode processing, and the quantization/inverse quantization and inverse DPCM local decode generation processing can be performed in parallel in different threads so that the entire throughput is enhanced like when hardware is mounted.

Similarly, when software for the processing according to the third embodiment is mounted (third variant), as in the first variant, the predictive pixel generation and the predictive mode selection can be performed in parallel in different threads from the local decode pixel generation including 2D DPCM so that throughput is enhanced like when hardware is mounted. Further, a predictive efficiency increases and image quality is enhanced as in the third embodiment.

Furthermore, when software for the processing according to the first variant is mounted (fourth variant), throughout is enhanced for the same reasons as the first and second variants. A predictive efficiency increases and image quality is enhanced for the same reasons as the third embodiment.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A video compression device configured to compress one pixel per cycle, the video compression device comprising:
an input original image buffer for storing input original image pixels therein in a raster scan order;
a line memory for storing local decode pixels therein;
a predictive pixel generation unit for sequentially selecting from among the input original image pixels and generating predictive pixel values of a plurality of predictive modes defined using local decode pixels read from predetermined positions of the line memory as upper reference pixels and an input original image pixel positioned on the left side of a pixel to be compressed as a left reference pixel for the pixel to be compressed;
a predictive mode determination unit for, using a unit made of a predetermined number of consecutive input original image pixels as a processing unit, calculating a predictive error of the unit based on differential values between a pixel value of the pixel to be compressed in the unit and the predictive pixel values, and selecting a minimum predictive mode in which the predictive error is minimum from among the plurality of predictive modes;
a (Differential Pulse Code Modulation) DPCM unit for, using local decode pixels in the line memory as upper reference pixels and a local decode pixel value one cycle before the pixel to be compressed as a left reference pixel, generating a minimum predictive pixel value corresponding to the minimum predictive mode, and generating a minimum differential value between the minimum predictive pixel value and the pixel to be compressed;
a quantization unit for generating quantized data in which the minimum differential value is quantized; an encode unit for converting the quantized data into a transmission code;
an inverse quantization unit for generating inversely quantized data in which the quantized data is inversely quantized; and
an inverse DPCM unit for generating local decode pixel values for the pixel to be compressed by use of the inversely quantized data and the minimum predictive pixel value, and sequentially storing them in the line memory, wherein the processing in the predictive pixel generation unit and the predictive mode determination unit, and the processing in the DPCM unit, the quantization unit, the inverse quantization unit and the inverse DPCM unit are performed in different pipeline stages.

2. The video compression device according to claim 1, wherein the predictive mode determination unit calculates the predictive error by a sum of absolute differences.

3. The video compression device according to claim 2, wherein compressed data output on transmission encoding by the encode unit has a predictive mode identification number for identifying the minimum predictive mode common within the processing unit.

4. The video compression device according to claim 1, further comprising an original image pixel correction unit for performing a correction processing on pixels read with reference to a position of a pixel to be compressed from the input original image buffer, and outputting corrected pixels to the predictive pixel generation unit.

5. The video compression device according to claim 4, wherein the processing in the original image pixel correction unit, the predictive pixel generation unit and the predictive mode determination unit, and the processing in the DPCM unit, the quantization unit and the inverse DPCM unit are performed in different pipeline stages.

6. The video compression device according to claim 5, wherein the predictive mode determination unit calculates the predictive error by a sum of absolute differences.

7. The video compression device according to claim 6, wherein compressed data output from the encode unit has a predictive mode identification number for identifying the minimum predictive mode common within the processing unit.

8. The video compression device according to claim 7, wherein the original image pixel correction unit outputs corrected pixel values, by correcting pixel values of the input original image pixels obtained by a quantization processing and an inverse quantization processing, to the predictive pixel generation unit.

9. The video compression device according to claim 7, wherein the original image pixel correction unit outputs pixel values obtained by correcting pixel values of the input original image pixels with predetermined lower bits to the predictive pixel generation unit.

10. The video compression device according to claim 7, wherein the original image pixel correction unit outputs, to the predictive pixel generation unit, pixel values corrected by applying a low-pass filter on adjacent pixel values in the horizontal direction under a condition that differential values of the adjacent pixel values within the processing unit are consecutively equal to or less than a predetermined threshold.

11. The video compression device according to claim 1, further comprising a rate control unit for controlling the compressed data output by the encode unit at a constant transmission rate.

12. The video compression device according to claim 11, wherein the compressed data includes quantization parameters set per luminance signal and color difference signal.

13. The video compression device according to claim 12, wherein the rate control unit outputs, to the quantization unit, the quantization parameters determined for the luminance signal and the color difference signal based on the amount of codes in the encode unit.

14. The video compression device according to claim 13, wherein the processing unit is on a 32-pixel basis.

15. A video compression device configured to compress one pixel per cycle, the video compression device comprising:
an input original image buffer for storing input original image pixels therein in a raster scan order;
a line memory for storing local decode pixels therein;
a predictive pixel generation unit for sequentially selecting from among the input original image pixels and generating predictive pixel values of a plurality of predictive modes defined using local decode pixels read from predetermined positions of the line memory as upper reference pixels and an input original image pixel positioned on the left side of a pixel to be compressed as a left reference pixel for the pixel to be compressed;
a predictive mode determination unit for, using a unit made of a predetermined number of consecutive input original image pixels as a processing unit, calculating a predictive error of the unit based on differential values between a pixel value of the pixel to be compressed in the unit and the predictive pixel values, and selecting a minimum predictive mode in which the predictive error is minimum from among the plurality of predictive modes;

a (Differential Pulse Code Modulation) DPCM unit for, using local decode pixels in the line memory as upper reference pixels and a local decode pixel value one cycle before the pixel to be compressed as a left reference pixel, generating a minimum predictive pixel value corresponding to the minimum predictive mode, and generating a minimum differential value between the minimum predictive pixel value and the pixel to be compressed;

a quantization unit for generating first quantized data in which the minimum differential value is quantized;

an encode unit for converting the quantized data into a transmission code; a quantization/inverse quantization unit for quantizing a differential value between the minimum predictive pixel value and the pixel to be compressed to generate second quantized data, and generating inversely quantized data in which the second quantized data is inversely quantized; and an inverse DPCM unit for generating local decode pixel values for the pixel to be compressed by use of the inversely quantized data and the minimum predictive pixel value, and sequentially storing them in the line memory, wherein the processing in the predictive pixel generation unit and the predictive mode determination unit, and the processing in the DPCM unit, the quantization/inverse quantization unit and the inverse DPCM unit are performed in different pipeline stages.

16. The video compression device according to claim 15, wherein the quantization/inverse quantization unit refers to an input/output relationship in a table form.

17. The video compression device according to claim 15, wherein the predictive mode determination unit calculates the predictive error by a sum of absolute differences.

18. The video compression device according to claim 17, wherein compressed data output from the encode unit has a predictive mode identification number for identifying the minimum predictive mode common within the processing unit.

* * * * *